United States Patent Office 3,190,916
Patented June 22, 1965

3,190,916
PROCESS FOR THE PRODUCTION OF N-SUBSTITUTED AMIDES FROM CYANOHYDRIN DERIVATIVES
Norman B. Rainer, North Bellmore, N.Y., assignor to Coastal Interchemical Company, Brooklyn, N.Y.
No Drawing. Filed Apr. 26, 1962, Ser. No. 190,217
4 Claims. (Cl. 260—559)

This invention relates to a novel process for the production of N-substituted organic amides from cyanohydrin derivatives.

Cyanohydrin compounds may generally be prepared by the addition of hydrogen cyanide to an organic aldehyde or ketone, thereby producing compounds characterized by presence of alpha hydroxy nitrile groups. The hydroxyl group may subsequently be etherified by appropriate known alkylating agents. Cyanohydrin derivatives are therefore obtainable having the structure:

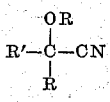

wherein R' may be hydrogen, alkyl, or phenyl, and R may be hydrogen or alkyl.

Although cyanohydrin derivatives thus constitute readily available materials from which other valuable products may be derived, the primary utility for cyanohydrin derivatives has generally been in the preparation of the corresponding carboxylic acid derivatives by hydrolysis of the nitrile groups.

Monomeric and polymeric N-substituted amides are valuable in many industrial chemical applications. Their method of preparation generally involves the reaction of an organic acid halide, acid anhydride or ester, with the primary or secondary amine containing the desired organic substituent attached to the nitrogen, thus yielding the corresponding N-substituted amide. The co-reactant organic acid derivative generally has to be prepared and isolated in separate previous steps from the corresponding, more commonly available acid.

It is an object of the present invention to provide a method for the preparation of N-substituted organic amides from organic cyanohydrin derivatives.

It is another object to provide a method for the preparation of N-substituted organic amides from organic cyanohydrin derivatives by a direct, single reaction process.

These and other objects and advantages will become apparent from the description of the invention contained in the following specification and claims.

The objects of this invention are accomplished in general by reacting a cyanohydrin derivative having the structural formula:

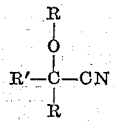

wherein R' is hydrogen alkyl, or phenyl and R is hydrogen or alkyl, with a mixture comprising water and an organic amine having at least one aliphatic primary or secondary amino group, said reaction being effected in a basic reaction zone at elevated temperatures, and removing ammonia from said zone.

Suitable cyanohydrin derivatives which may be satisfactorily employed in the process of this invention include: hydroxyacetonitrile, ethoxyacetonitrile, lactonitrile, acetone cyanohydrin, 3 ethoxy, 3 cyanopentane, mandelonitrile, 1,6 dihydroxy, 1,6 dicyano hexane, cyanohydrins of reducing sugars, cyanohydrins of polysaccharides having been oxidized with periodic acid and containing aldehyde groups, and other cyanohydrins and etherified cyanohydrins of monofunctional and polyfunctional ketones and aldehydes. The cyanohydrin derivative may be liquid or solid but should be soluble in water to the extent of at least 5% under the reaction conditions of the process of this invention. Preferable cyanohydrin derivatives should possess adequate hydrolytic stability with respect to conversion of the nitrile group to the carboxylic acid, and with respect to reversion to the aldehyde or ketone during the reaction process. Any hydrolytic tendencies should occur at an appreciably slower rate than the rate of formation of the N-substituted amide reaction product. The relative stability of the cyanohydrin may be determined by boiling a 5% solution of the cyanohydrin in distilled water for five minutes and determining whether HCN or $NH_3$ is liberated.

The amine component in the reaction process of this invention contains at least one primary or secondary amine group which is not directly attached to an aromatic ring, since the aromatic group has a de-activating influence. Thus aniline is not a suitable amine species, but benzylamine is satisfactory. Representative suitable amines include methyl amine, dimethyl amine, ethyl amine, propyl amine, diethyl amine, dipropyl amine, butyl amine, monoethanol amine, diethanol amine, 1,3 diamino propane, hexamethylene diamine, lauryl amine, morpholine, piperidine, piperazine, poly ($\beta$-amino-ethyl) methacrylate; and species analogous thereto containing non-interfering substituent groups.

Although the theoretical explanation of the single stage reaction process of this invention is not clear, it is generally found that approximately equal molar proportions of cyanohydrin groups, water, and amine groups are required to secure completion of the reaction with satisfactory yields. It is generally found preferable to mix the requisite amounts of cyanohydrin, water, and amine in carrying out the reaction process, although any one of the three ingredients may be added separately and in small amounts to a mixture of the other two ingredients. However, it is necessary that all three ingredients be present in simultaneous contact to secure the reaction characteristics of this invention. Excess amounts of water are generally desirable to maintain temperature and fluidity. The reaction medium or zone must be basic to initiate and maintain the reaction. The necessary basicity is generally provided by the amine reactant or the liberated ammonia; and this precludes the presence of excess strong acid, especially strong inorganic acids. In fact, the presence of even minor amounts of the cation radicals of strong acids is generally undesirable. Inert miscible or immiscible solvents may be employed.

Temperatures in the range of 60° to 190° C. have generally been found satisfactory in causing the reaction to occur, but the optimum temperature for any given system will depend upon concentrations of reactants, pressures, rate and method of removal of ammonia, and inherent reactivities of the reactants employed. Reaction times of from about two to about thirty hours may be employed. The equipment employed in carrying out the process may be closed or open vessels provided with means for heating, agitation, and removal of ammonia. It is frequently desirable to exclude oxygen so as to avoid discoloration of the amine ingredient. The course of the reaction is indicated by the liberation of ammonia from the reaction mixture, and occasionally by distinctive color changes. The ammonia must be removed, preferably continuously, in order to maintain the chemical reaction. In situations where sealed autoclave reaction conditions are employed, the autoclave must be vented frequently to remove ammonia in order to enable the reaction to proceed.

The reaction process of the present invention may in general follow the equation below although the invention is not intended to be limited thereto:

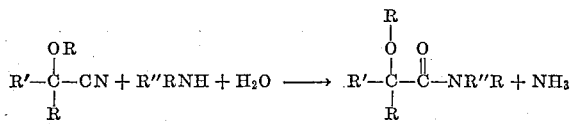

where R and R' are defined as above, and R" is an alkyl group. Under certain circumstances, the group -OR may be replaced by NH₂ in the course of the reaction, especially when minimum quantities of water are employed, and ammonia is not rapidly removed from the reaction zone. The products of this invention are generally non-crystalline oils and pastes, and are useful as plasticizing agents, corrosion inhibiting agents, and humectants for leather.

The products may in general be purified by: treatment with activated charcoal; fractional precipitation from solvent-nonsolvent mixtures; chromatographic adsorption on elution columns employing adsorbent packings such as activated alumina, silicic acid, and activated charcoal; and by fractional distillation under vacuum. Analytical methods useful in characterizing the products are: elemental analyses; infra-red spectrophotometric analysis; preparation and analysis of chemical derivatives; and other conventional physical and chemical methods of identification.

The following examples serve to illustrate the invention but they are not intended to limit it thereto. All parts and percentages are by weight unless otherwise indicated.

*Example I*

Sixty-one grams of monoethanolamine and 20 grams of water are charged to a 250 cc. flask equipped with stirrer, thermometer, reflux condenser and external heating mantle. 81.5 grams of 70% aqueous hydroxy acetonitrile are slowly added from a dropping funnel to the stirred mixture. An exothermic reaction ensues and the mixture becomes green in color. The mixture is then heated at 75° C. for three hours, during which time the color of the mixture turns from green to dark brown, the solution becomes slightly more viscous, and a considerable amount of ammonia is vented from the system through the top of the reflux condenser. Heating and stirring are maintained until ammonia is no longer liberated. The reaction product is treated with 25 grams of activated charcoal, filtered, and dried under vacuum. The dried product is purified by fractional precipitation from ethanol solution with non-solvents. The purified product, N-(β hydroxyethyl) hydroxyacetamide is obtained in 51% yield.

*Example II*

One hundred and thirty-three grams of mandelonitrile, 105 grams of diethanolamine, and 60 cc. of water are charged to a 500 cc. flask equipped with stirrer, thermometer, reflux condenser, and external heating mantle. The mixture is refluxed at 116° for 30 hours, during which time ammonia is liberated, and is removed by a flow of nitrogen gas passing through the system. The reaction product mixture is a homogenous dark liquid. The product is treated with 25 grams of activated charcoal, filtered, and dried under vacuum. The dried product is purified by fractional precipitation from an ethanol solution with incremental additions of cyclohexane. The purified product, N,N bis-(β hydroxyethyl) mandelamide, is obtained in 67% yield.

*Example III*

A mixture of 224 parts 1,6 diethoxy, 1,6 dicyano hexane, 116 parts hexamethylene diamine and 60 parts water is heated at 60° C. with continuous agitation under a blanketing flow of nitrogen for 9 hours. The mixture gradually thickens and darkens, and ammonia is steadily removed from the system by the nitrogen gas flow. The reaction is completed by heating for ½ hour at 185° C. and removing excess water. The product is a thermoplastic polyamide resin which can be drawn into long filaments. A 10% solution of the resinous product in dimethyl formamide, upon drying on a glass plate, forms coatings of high gloss and excellent adhesion.

As many widely different embodiments may be made without departing from the spirit and scope of this invention, it is to be understood that the invention is to be in no wise restricted save as set forth in the appended claims.

I claim:
1. A process for the production of an N-substituted organic amide of the formula

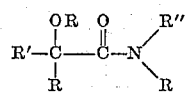

wherein R is selected from the group consisting of hydrogen and alkyl, R' is selected from the group consisting of hydrogen, alkyl, and phenyl, and R" is alkyl, consisting of reacting a cyanohydrin compound of the formula

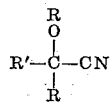

with water and an amine of the formula

said R, R' and R" entities being as defined above, said reaction being effected in a basic reaction zone at a temperature in the range of 60° C. to 190° C., and removing ammonia from said zone.

2. The process of claim 1 wherein essentially equimolar amounts of cyanohydrin groups, amine groups, and water are employed per mole of N-substituted amide product groups obtained.

3. The process of claim 1 wherein said cyanohydrin compound is hydroxy acetonitrile.

4. The process of claim 1 wherein said cyanohydrin compound is mandelonitrile.

References Cited by the Examiner

UNITED STATES PATENTS 2,476,500   7/49   Mahan _____ 260—561

FOREIGN PATENTS 453,627   12/48   Canada.

OTHER REFERENCES

Exner et al.: Journ. Am. Chem. Soc., vol. 77, pp. 1103–5 (1955).

IRVING MARCUS, *Primary Examiner.*

NICHOLAS S. RIZZO, *Examiner.*